(12) United States Patent
Matsuoka (10) Patent No.: US 8,081,185 B2
(45) Date of Patent: Dec. 20, 2011

(54) INFORMATION PROCESSING APPARATUS AND INFORMATION PROCESSING METHOD (75) Inventor: Hirochika Matsuoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 963 days.

(21) Appl. No.: 11/944,917

(22) Filed: Nov. 26, 2007

(65) Prior Publication Data

US 2008/0136818 A1 Jun. 12, 2008

(30) Foreign Application Priority Data

Dec. 7, 2006 (JP) ................................ 2006-331137

(51) Int. Cl.
G06T 15/20 (2011.01)

(52) U.S. Cl. ........ 345/427; 345/419; 345/590; 345/593; 345/600; 382/162; 382/167; 382/283; 358/1.9; 358/515

(58) Field of Classification Search .................. 345/419, 345/427, 593, 1.3, 1.1, 903, 599, 600, 634; 382/162, 167; 358/1.9, 515
See application file for complete search history.

(56) References Cited

U.S. PATENT DOCUMENTS

| 5,559,446 | A | * | 9/1996 | Sano | 324/750.03 |
|---|---|---|---|---|---|
| 5,704,021 | A | * | 12/1997 | Smith et al. | 358/1.9 |
| 6,118,896 | A | * | 9/2000 | Ohnuma | 382/167 |
| 6,165,406 | A | * | 12/2000 | Jang et al. | 264/308 |
| 6,421,142 | B1 | * | 7/2002 | Lin et al. | 358/1.9 |
| 6,426,757 | B1 | * | 7/2002 | Smith et al. | 345/634 |
| 6,542,634 | B1 | | 4/2003 | Ohga | 382/167 |
| 6,850,640 | B2 | | 2/2005 | Ohga | 382/162 |
| 6,897,988 | B1 | | 5/2005 | Saito et al. | 358/515 |
| 6,961,477 | B2 | | 11/2005 | Martinez-Uriegas et al. | 382/283 |
| 7,116,338 | B2 | | 10/2006 | Fukao et al. | 345/593 |
| 7,358,929 | B2 | * | 4/2008 | Mueller et al. | 345/1.3 |
| 7,676,403 | B2 | * | 3/2010 | Crutchfield et al. | 705/26.1 |
| 2002/0054307 | A1 | | 5/2002 | Matsuoka | 358/1.9 |
| 2005/0146736 | A1 | | 7/2005 | Matsuoka et al. | 358/1.9 |
| 2005/0169519 | A1 | | 8/2005 | Minakuti et al. | 382/162 |

FOREIGN PATENT DOCUMENTS

| JP | 9-270926 | 10/1997 |
|---|---|---|
| JP | 2000-200299 | 7/2000 |
| JP | 2000-050086 | 12/2000 |
| JP | 2003-125214 | 4/2003 |
| JP | 2005-210526 | 8/2005 |

* cited by examiner

Primary Examiner — Kimbinh T Nguyen
(74) Attorney, Agent, or Firm — Fitzpatrick, Cella, Harper & Scinto

(57) ABSTRACT

Appearance parameters for each object are set by pressing an appearance parameter setting button (208) for each object ID selected by a body object selection button (207). Upon generation of a two-dimensional image for pseudo three-dimensional presentation, the color values of each object are determined based on the appearance parameters set for that object. A satisfactory three-dimensional presentation image can be generated according to the adaptation state of a human visual perception.

7 Claims, 11 Drawing Sheets

INFORMATION PROCESSING APPARATUS AND INFORMATION PROCESSING METHOD

BACKGROUND OF THE INVENTION

1. Field of the Invention

The present invention relates to an information processing apparatus and information processing method and, more particularly, to an information processing apparatus and information processing method, which generate an image for a pseudo three-dimensional presentation based on objects allocated on a virtual three-dimensional space.

2. Description of the Related Art

Recently, a three-dimensional computer graphics (to be abbreviated as 3D-CG hereinafter) technique which implements a pseudo three-dimensional (3D) presentation of a 3D shape on a two-dimensional (2D) screen has rapidly prevailed. This 3D-CG technique is used in many fields such as CAD (Computer Aided Design), physical simulations, and design simulations. In recent years, a technique which composites a video of a physical world and 3D-CG image to present image information closer to a human perception to the user is being developed. Such technique is called an AR (Augmented Reality) system or MR (Mixed Reality) system, and is used in the fields of design simulations of industrial products, video creation, and the like.

In the conventional technique using such 3D-CG, physical colors to be presented are calculated by the following method. That is, pieces of optical information such as a reflectance, radiance, refractive index, and transmittance are set for an object such as a 3D object model or light source, and a physical color to be presented is calculated based on the tristimulus values such as XYZ values or the like or the spectral distribution. With this method, the physical color can be calculated with considerably high precision, and a presentation image that matches a human subjective perception can be obtained for an object allocation which is limited to some extent. Note that the limited object allocation corresponds to a case wherein it can be assumed that there is no object that intercepts a parallel light source, and an object is viewed under a uniform viewing environment.

Also, a color appearance model which considers color appearance differences depending on viewing conditions has been proposed. A technique for making color matching of an image using this color appearance model has been proposed (for example, see Japanese Patent Laid-Open No. 2000-050086 (U.S. Pat. No. 6,542,634)).

Figure 9:
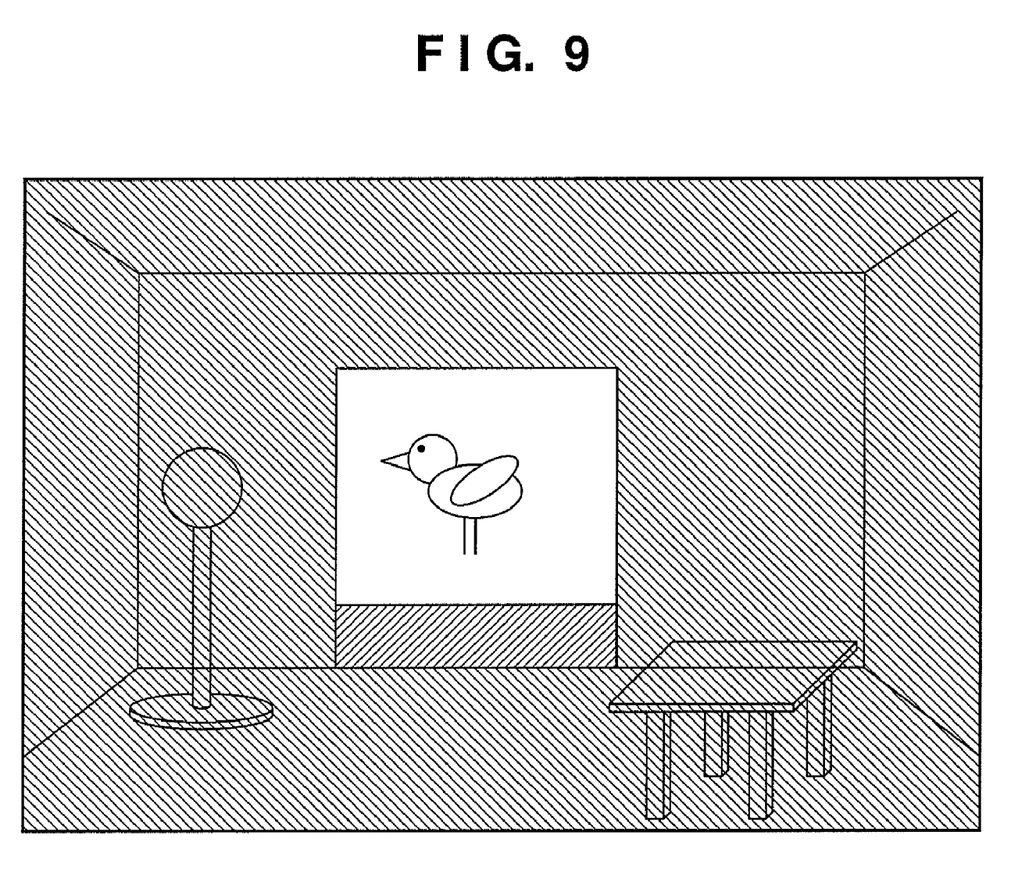
FIG. 9 shows an example of the conventional rendering result.

According to the conventional 3D-CG technique, when the object allocation or light source condition becomes complicated, a generated image (rendering image) does not match a human subjective perception, and the user may feel unnatural. As such example, a case in which a house, furniture, and outdoors are set as objects, and the user in the house looks outdoors is known. In such case, for example, as shown in FIG. 9, the interior is generated as an unnaturally dark image, and does not match the human subjective perception.

Such unnaturalness is caused not by the physical color calculations based on optical models of objects but by conversion from a physical color into an image presentation color. According to the conventional image color conversion, the conversion from a physical color into an image presentation color uses a uniform conversion formula. For example, when a physical color is expressed by XYZ values, it is uniformly converted over the entire surface of a presentation image according to sRGB conversion formulas in general. In terms of visual perception, this process assumes that the adaptation state does not change irrespective of viewing objects. For this reason, the interior is generated as an unnaturally dark image, as shown in, for example, FIG. 9, and the rendering image does not match human subjective perception, as described above.

The adaptation state of an actual human visual perception changes depending on the brightness levels and colors of viewing objects. Therefore, in order to approximate the rendering image to the actual human perception, a physical color must be converted into a presentation color in consideration of an object to be viewed, that is, a rendering object, and the adaptation state. As described above, taking as an example the aforementioned case wherein objects are allocated so that the user can figuratively look outdoors from inside the house, the presentation colors of objects inside the house must be calculated based on psychophysical colors with the pupils opened, and those of objects outdoors must be calculated based on psychophysical colors with the pupils closed.

Furthermore, conventionally, the 3D-CG technique and color matching are not processed in collaboration with each other.

SUMMARY OF THE INVENTION

The present invention has been made to solve the aforementioned problems, and has as its object to provide an information processing apparatus and information processing method, which can generate a satisfactory pseudo 3D image based on the adaptation state of the human visual perception.

According to one aspect of the present invention, there is provided an information processing apparatus for generating a two-dimensional image according to designated viewpoint information on a virtual three-dimensional space on which objects are allocated, the apparatus comprising:

an acquisition unit configured to acquire object data including appearance information, coordinate information, and shape information;

a generation unit configured to generate a two-dimensional image according to viewpoint information based on the object data; and a correction unit configured to apply appearance matching correction to color data using the appearance information of an object corresponding to the color data.

According to another aspect of the present invention, there is provided an information processing method for generating a two-dimensional image according to designated viewpoint information on a virtual three-dimensional space on which objects are allocated, the method comprising:

an acquisition step of acquiring object data including appearance information, coordinate information, and shape information;

a generation step of generating a two-dimensional image according to viewpoint information based on the object data; and a correction step of applying appearance matching correction to color data using the appearance information of an object corresponding to the color data.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that the arrangements to be described in the following embodiments are merely examples, and the present invention is not limited to the illustrated arrangements.

First Embodiment

[System Overview]

Figure 1:
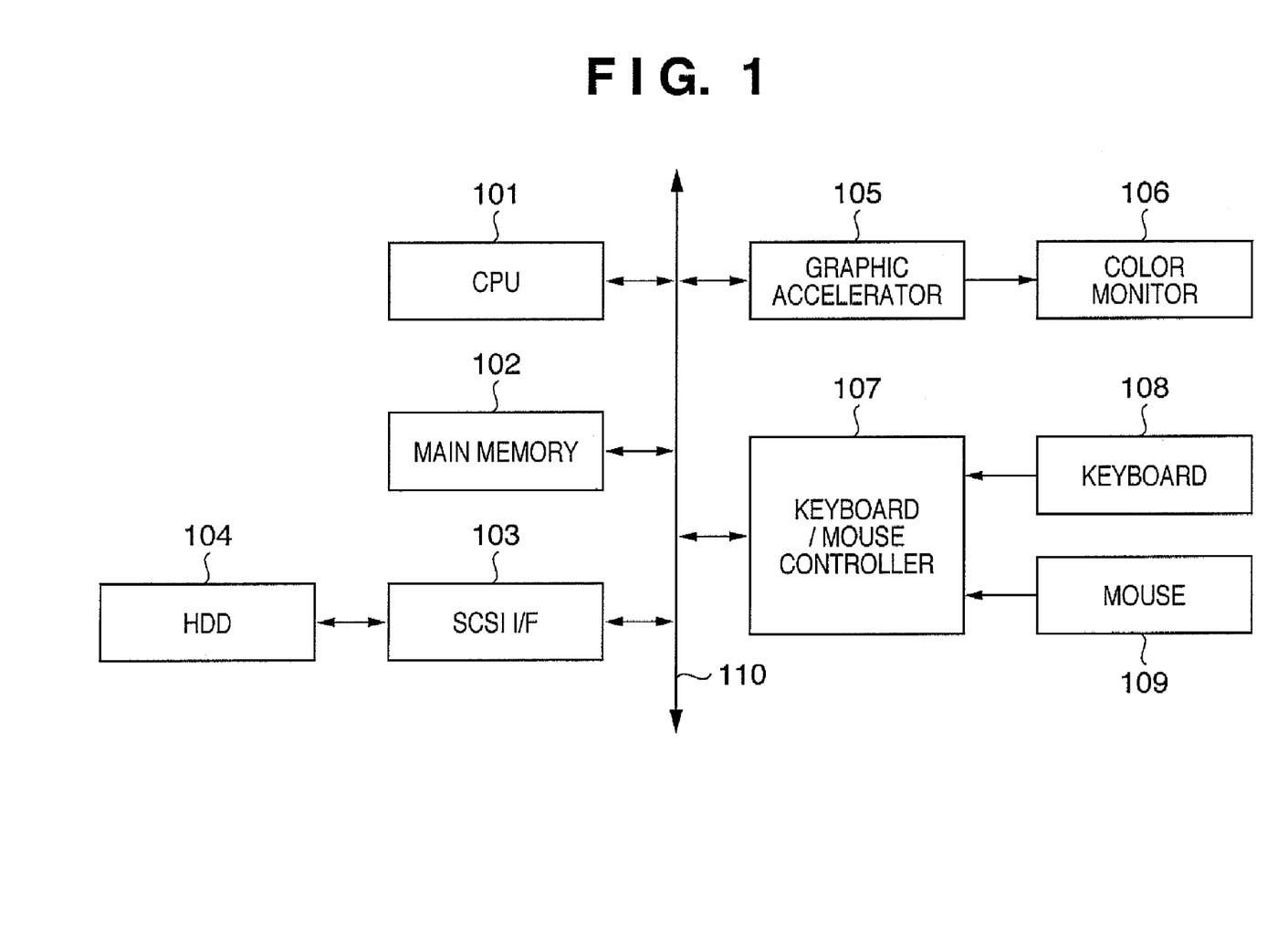
FIG. 1 is a block diagram showing the system arrangement of an image generating apparatus according to one embodiment of the present invention.

An image generating apparatus according to this embodiment generates an image for a pseudo 3D presentation based on objects allocated on a virtual 3D space, and displays them on a monitor. FIG. 1 is a block diagram showing the system arrangement of the image generating apparatus according to this embodiment. Referring to FIG. 1, reference numeral 101 denotes a CPU; 102, a main memory; 103, a SCSI interface; and 104, an HDD. Reference numeral 105 denotes a graphic accelerator; 106, a color monitor; 107, a keyboard/mouse controller; 108, a keyboard; 109, a mouse; and 110, a PCI bus.

A series of image composition operations in the arrangement shown in FIG. 1 will be described below. The CPU 101 launches a pseudo 3D image composition application stored in the HDD 104 based on an OS program that receives a user's instruction. An image composition object file (to be referred to as an object file hereinafter) stored in the HDD 104 is read out according to the processing of the pseudo 3D image composition application based on a user's instruction. The object file is transferred to the main memory 102 via the SCSI interface 103 and PCI bus 110 based on a command from the CPU 101, and is stored as object data.

The object data held in the main memory 102 in this way undergoes edit operations by the processing of the 3D image composition application based on a user's instruction. Upon completion of the edit operations by the user, a pseudo 3D image is composited to a 3D object in the object data (this process will be referred to as rendering hereinafter), and an image obtained as a result of rendering is stored in the main memory 102.

Digital image data stored in the main memory 102 in this way is transferred to the graphic accelerator 105 via the PCI bus 110 in accordance with a command from the CPU 101. Then, the graphic accelerator 105 D/A-converts the digital image data into analog image data, and transmits the analog image data to the color monitor 106 via a display cable. In this way, an image is displayed on the color monitor 106.

[Pseudo 3D Image Composition Application]

The pseudo 3D image composition application in this embodiment will be described below with reference to FIGS. 2A, 2B, and 2C.

Figure 2A:
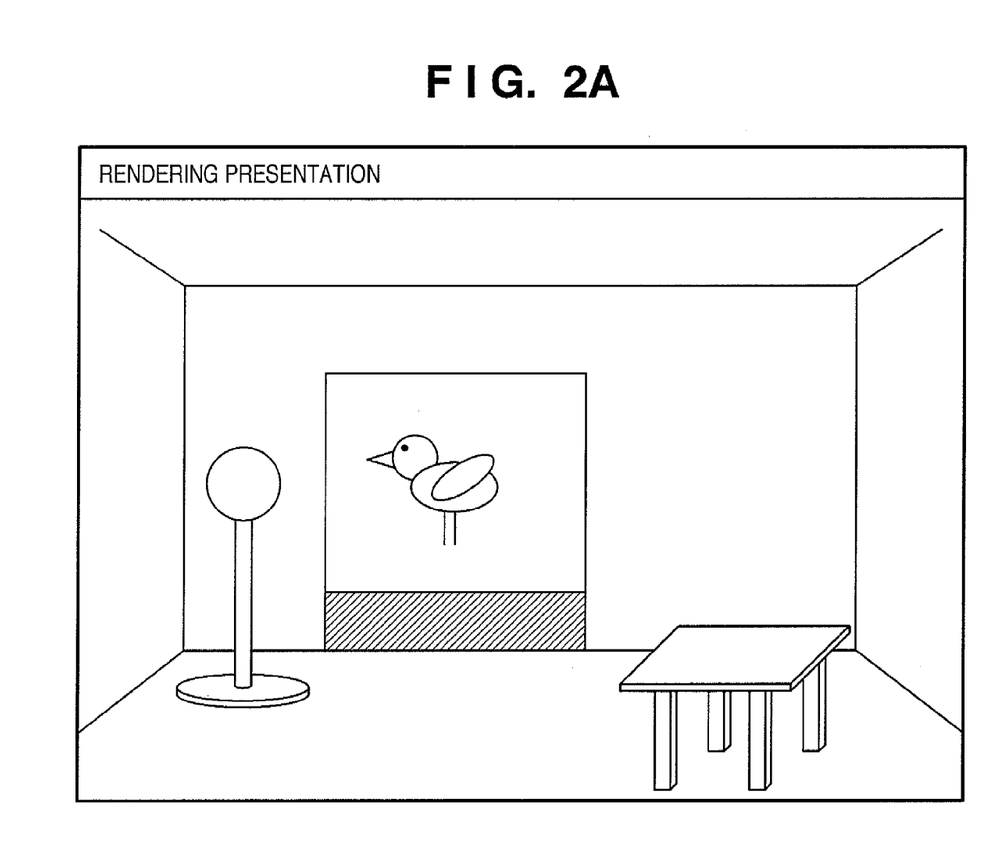
FIG. 2A shows a window example which attains a pseudo 3D presentation of a rendering result in this embodiment.
Figure 2B:
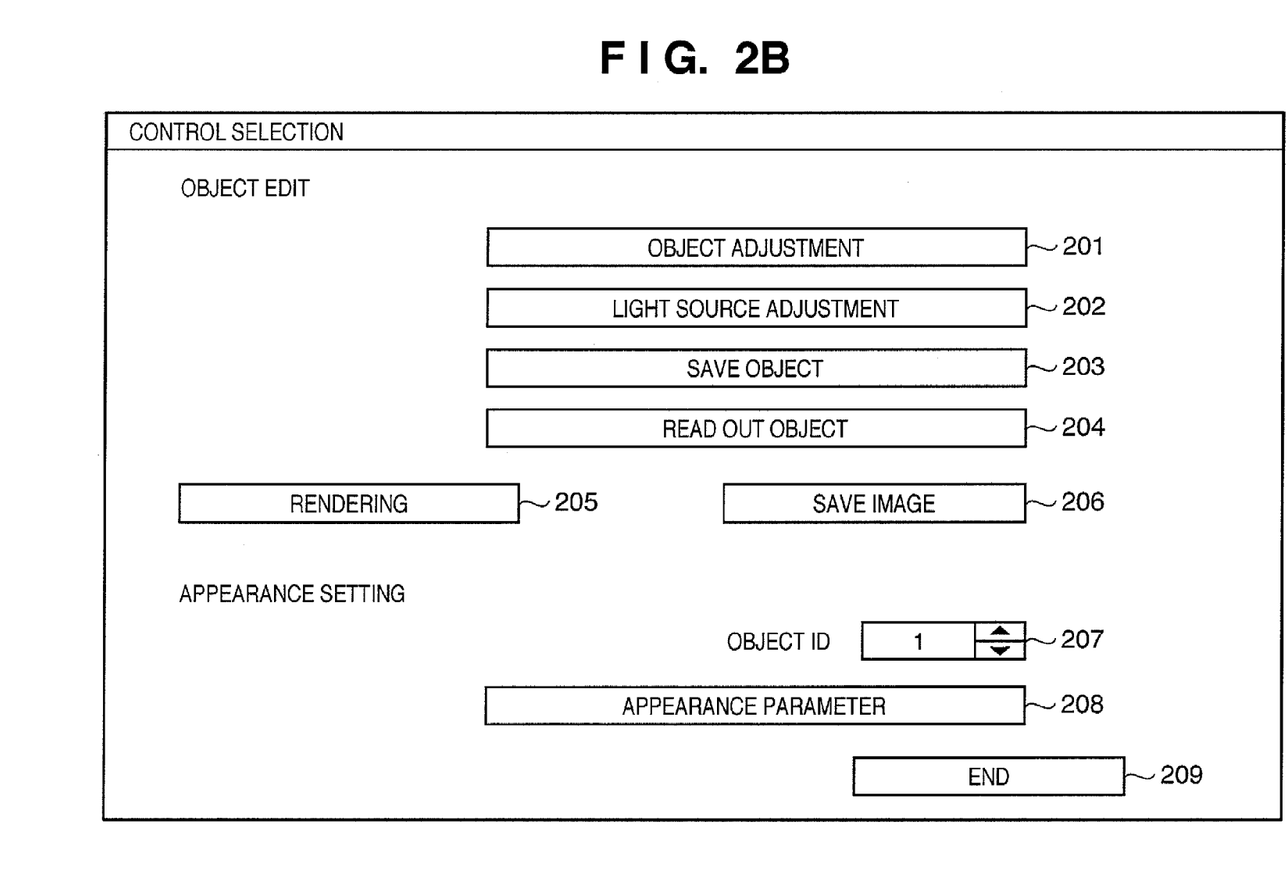
FIG. 2B shows a UI example in a pseudo 3D image composition application in this embodiment.
Figure 2C:
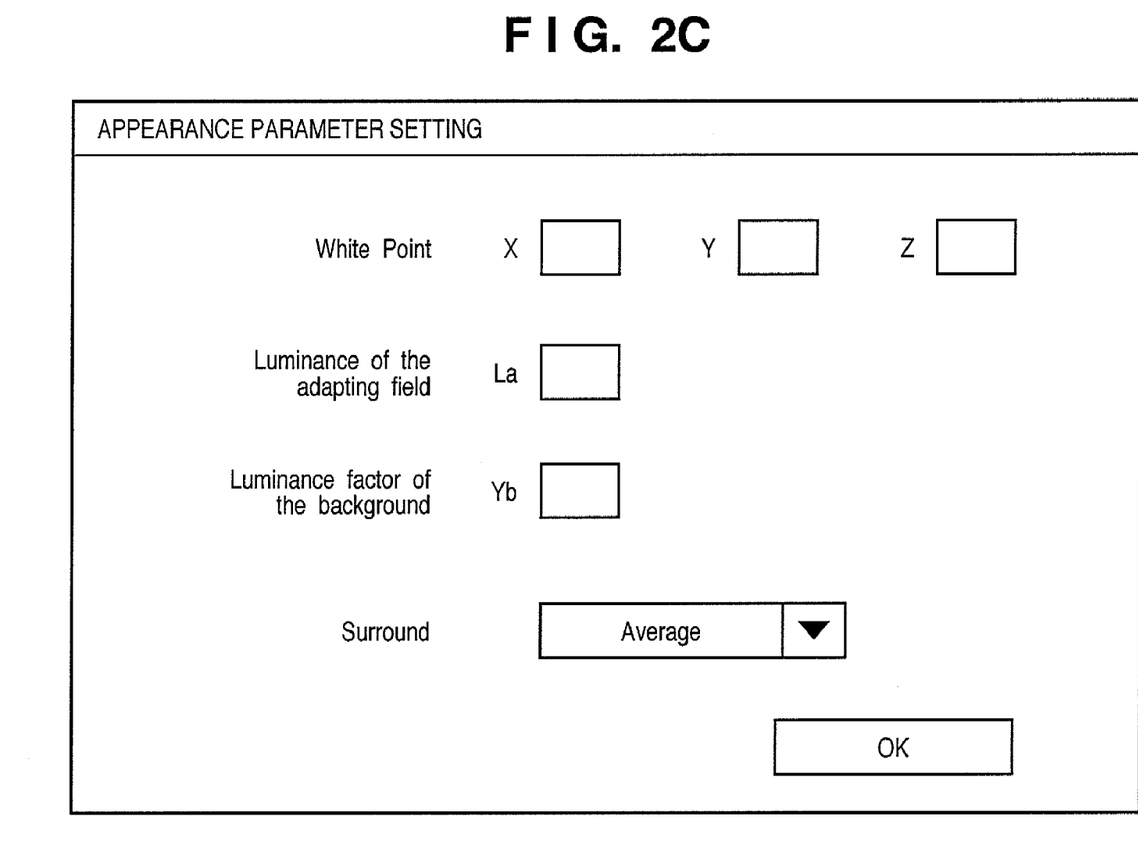
FIG. 2C shows a UI example used to set CIECAM02 parameters in this embodiment.

Upon launching the pseudo 3D image composition application of this embodiment, windows shown in FIGS. 2A and 2B are displayed on the color monitor 106. FIG. 2A shows a window which makes a pseudo 3D presentation of the rendering result, and FIG. 2B shows a window which allows the user to edit an object and to start rendering. The user gives instructions to the pseudo 3D image composition application using the mouse or keyboard from these windows shown in FIGS. 2A and 2B, and the application generates a pseudo 3D image based on the object edit result. The generated pseudo 3D image is saved in the HDD 104 in accordance with a user's instruction.

The object edit processing is executed based on buttons 201 to 204 shown in FIG. 2B, and rendering based on an object is executed by pressing a button 205. A generated pseudo 3D image is saved as a bitmap image in the HDD 104 by pressing a button 206. Note that the object edit processing of this embodiment uses a known technique, and a detailed description thereof will not be given.

The respective buttons shown in FIG. 2B used to instruct the object edit processing will be described below. The button 201 is a body object adjustment button. Upon pressing of the button 201, a body object edit dialog (not shown) is displayed to edit a body object. The button 202 is a light source object adjustment button. Upon pressing of the button 202, a light source object edit dialog (not shown) is displayed to edit a light source object. The button 203 is an object save button. Upon pressing of the button 203, the edited light source object and object information are saved in the HDD 104 according to the data structure to be described later. The button 204 is an object read button. Upon pressing of the button 204, the data saved in the HDD 104 according to the data structure to be described later is read out onto the main memory 102. The detailed data structure of object data of this embodiment will be described later.

The setting method of appearance parameters shown in FIG. 2B will be described below. Reference numeral 207 denotes a body object selection button, which is used to select an ID number for an object for which appearance parameters can be set. Reference numeral 208 denotes an appearance parameter setting button, which is used to set appearance parameters for the object selected by the body object selection button 207. Upon pressing of the appearance parameter setting button 208, a dialog shown in FIG. 2C is displayed to allow the user to set CIECAM02 parameters as appearance parameters. The CIECAM02 parameters that can be set include four parameters shown in FIG. 2C; "White Point", "Luminance of the adapting field", "Luminance factor of the background", and "Surround". As for "Surround", one of three levels "Average", "Dim", and "Dark" is selected from a pull-down list.

[Object Data Structure]

The data structure of object data of this embodiment will be described below with reference to the tree charts of FIGS. 3 and 4.

Figure 3:
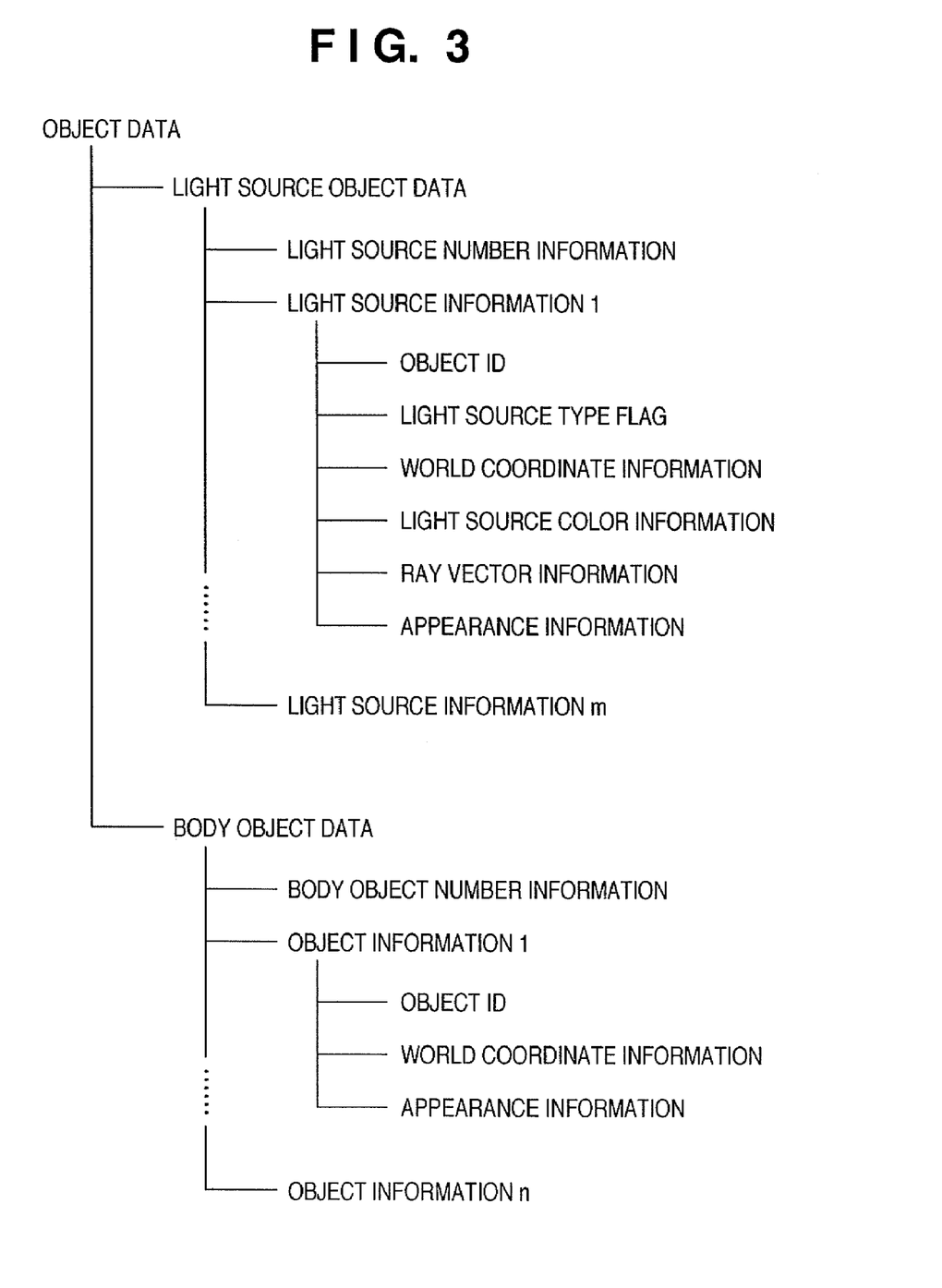
FIG. 3 shows the data structure that describes an object configuration in this embodiment.

The object data of this embodiment is expressed by the tree data structure shown in FIG. 3, and data of a root include "light source object data" and "body object data". The "light source object data" includes "light source number information" indicating the number of light sources, and pieces of "light source information (1 to m)" as many as the number of light sources. The "body object data" includes "object number information" indicating the number of objects, and pieces of "object information (1 to n)" as many as the number of objects.

Each "light source information (1 to m)" includes six pieces of information; "object ID", "light source type flag", "world coordinate information", "light source color information", "ray vector information", and "appearance information", as shown in FIG. 3. In this embodiment, as light source types indicated by the "light source type flag", four types, that is, parallel light, a point light source, a surface light source, and environmental light, are prepared, and the "ray vector information" is set according to the selected light source type. Also, the "world coordinate information" is set as the light source position, and a light intensity is set using XYZ values as the "light source color information". Furthermore, in the case of direct rendering of a light source object in the pseudo 3D image composition, CIECAM02 parameters are described as the "appearance information". Note that the CIECAM02 parameters will be described in detail later.

Each "object information (1 to n)" includes three pieces of information; "object ID", "world coordinate information", and "appearance information", as shown in FIG. 3. In this embodiment, an ID number as an identifier for object information (FIG. 4; to be described later) is associated with the "object ID" of an object. With this ID number, an object type allocated on the world coordinates is determined. As the object position, the "world coordinate information" is set, and CIECAM02 parameters are described as the "appearance information".

The data structure of the "object information" which is designated by the "object ID" in the "object information (1 to n)" and indicates the object allocation on the world coordinates in the object data shown in FIG. 3 will be described below with reference to the tree chart of FIG. 4.

Figure 4:
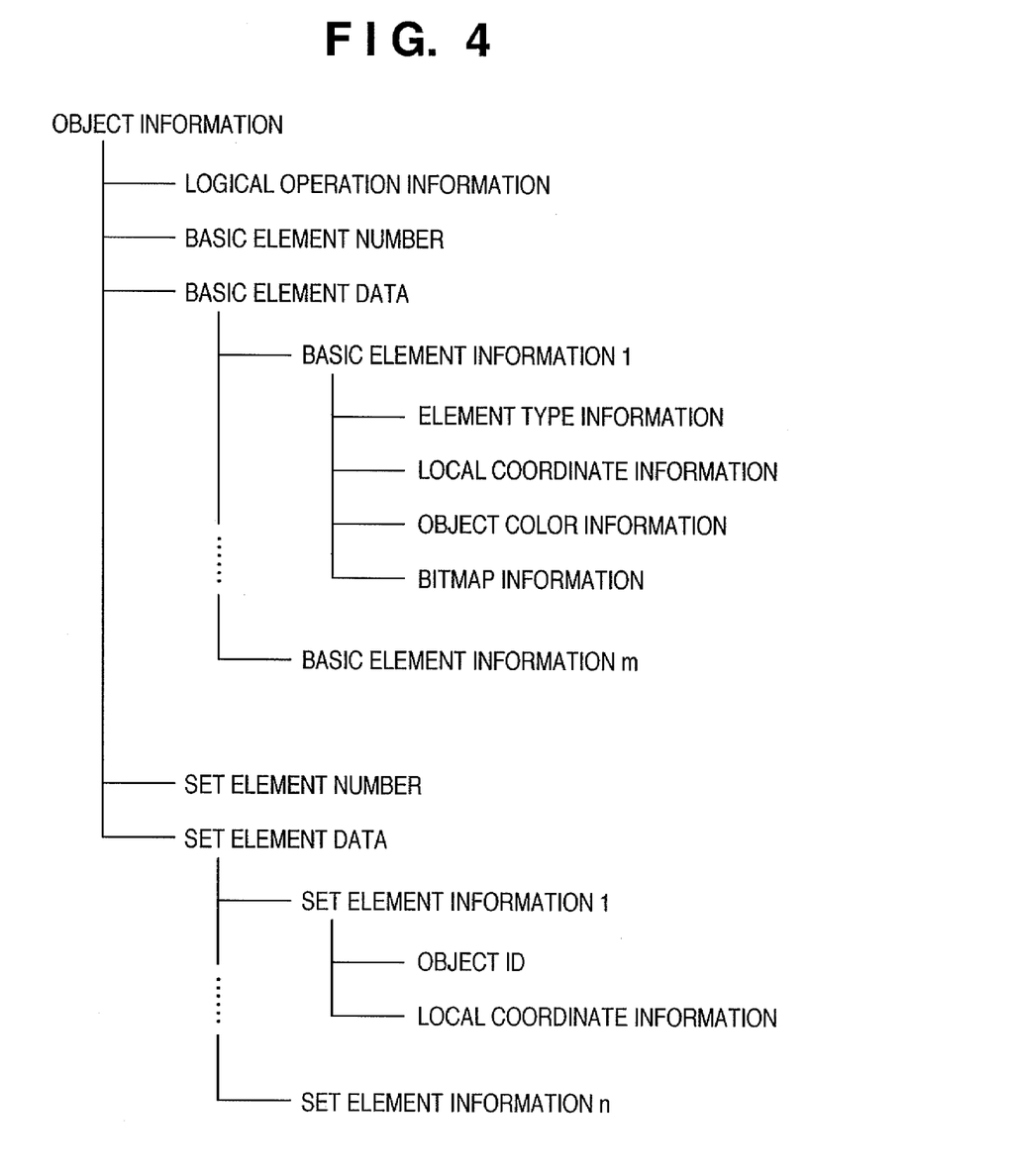
FIG. 4 shows the data structure that describes an object configuration in this embodiment.

As shown in FIG. 4, the root of the "object information" of this embodiment describes "basic element data" and "basic element number", "set element data" and "set element number", and "logical operation information" for these elements. Furthermore, the "basic element data" includes pieces of "basic element information (1 to m)" as many as the number according to the "basic element number" information, and the "set element data" includes pieces of "set element information (1 to n)" as many as the number according to the "set element number" information.

Figure 5:
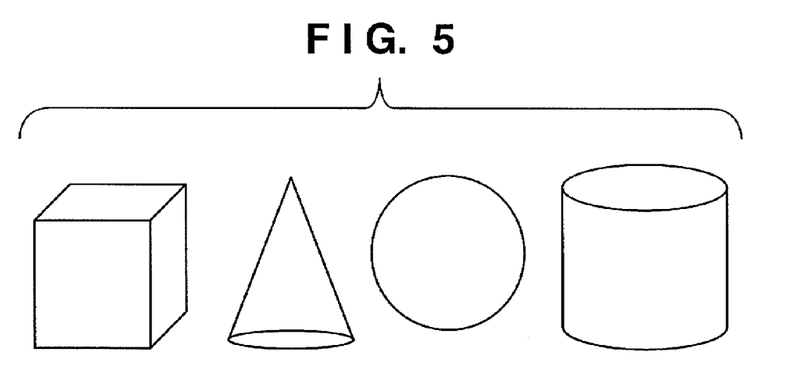
FIG. 5 shows the types of 3D objects in this embodiment.

Each "basic element information (1 to m)" further includes "element type information", "local coordinate information", "object color information", and "bitmap information" for texture mapping. In this embodiment, as basic element types indicated by the "element type information", two types of elements, that is, a triangle patch and spline curved surface are prepared in addition to four types of elements, that is, a rectangular parallelepiped, circular cone, sphere, and circular column shown in FIG. 5. Also, the "local coordinate information" in the object information is set, and an XYZ reflectance is set as the "object color information". Furthermore, as an option, the "bitmap information" for texture mapping using an XYZ reflectance is prepared.

Each "set element information (1 to n)" includes "object ID" of an object indicating predetermined object information, and "local coordinate information". However, an ID number is inhibited from being recursively assigned as the "object ID". Note that the "local coordinate information" is set as local coordinate information in the object information.

The "logical operation information" specifies processes to be executed between a plurality of body objects. The logical operations include, for example, a process for computing a common part of objects (product) and a process for boring a common part (difference). Using the logical operations, a complicated shape model can be easily formed by combining objects of simple shapes.

As described above, the "object information" of this embodiment is finally decomposed into pieces of "basic element information (1 to n)", and an object is formed by making the logical operations of these basic elements. That is, the object information includes appearance information, coordinate information, and shape information.

[Rendering Processing]

The rendering operation of this embodiment will be described below. Note that rendering of this embodiment is executed using a known ray tracing method. Therefore, a description of the ray tracing method will not be given, and the operation associated with rendering based on the CIECAM02 parameters as a characteristic feature of this embodiment will be explained.

Generation of XYZ Image

Figure 6:
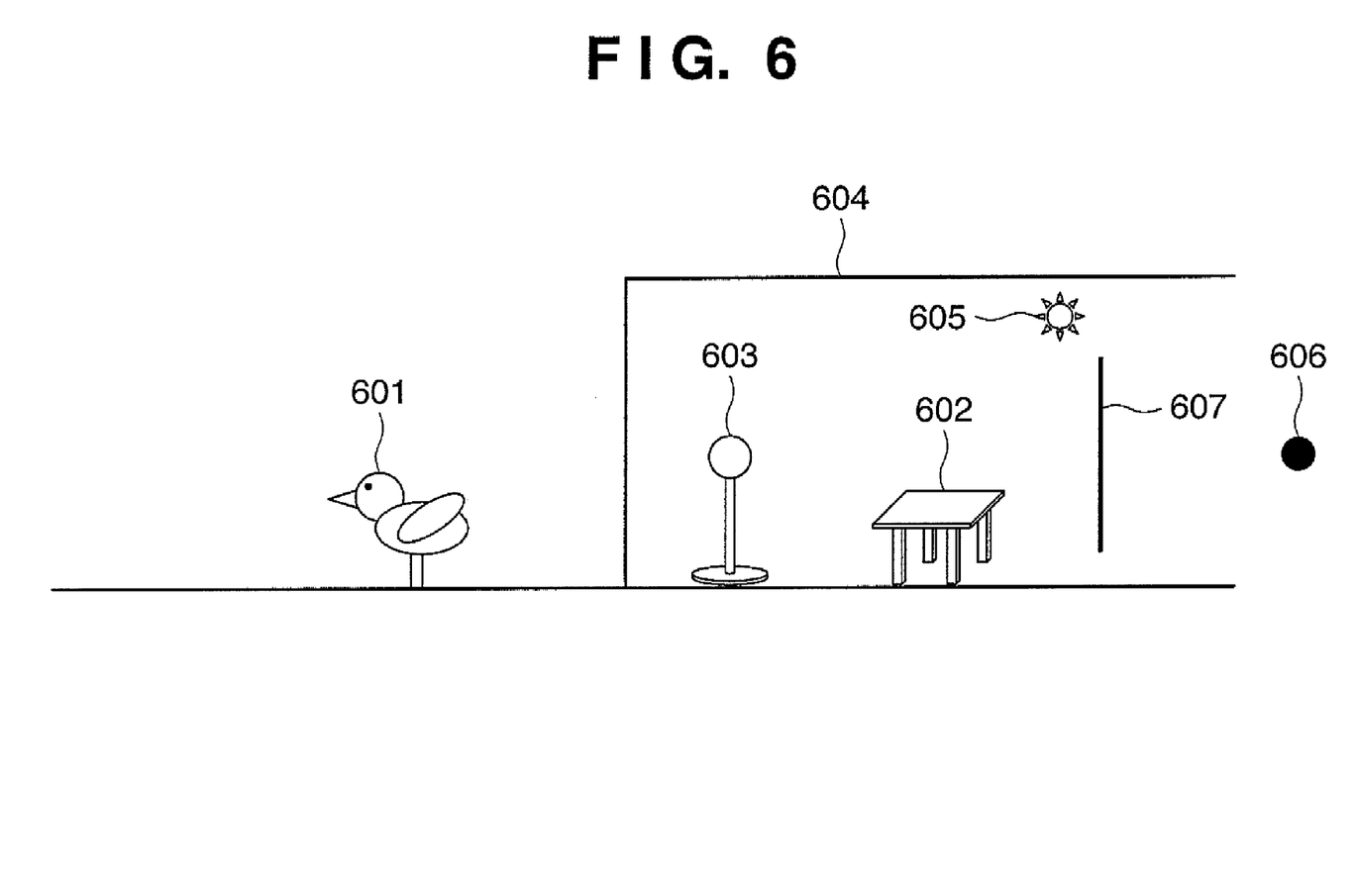
FIG. 6 shows the allocations of 3D objects in this embodiment.

FIG. 6 shows the allocations of 3D objects for which pseudo images are to be generated. In FIG. 6, reference numerals 601 to 604 denote body objects allocated on the world coordinates; and 605, a point light source. The body object 604 indicates a house, the body object 601 is allocated outside the object 604, and the body objects 602 and 603 and the point light source 605 are allocated inside the object 604. Although not shown, parallel light is projected from above. Furthermore, reference numeral 606 denotes a viewpoint allocated on the world coordinates; and 607, a screen. Note that the number of pixels of the screen 607 is set to be 1280 dots (horizontal)×1024 dots (vertical).

According to a general ray tracing method, a vector from the viewpoint 606 to a predetermined pixel on the screen 607 is generated, and a pseudo 3D image is generated by tracing this vector. In vector tracing, intersection operations with a body object are made. In this embodiment, an object ID is acquired from a body object explored first by this ray tracing, and this ID value is stored in the main memory 102 as associated information for that pixel. The stored ID is used as information for determining appearance parameters used in conversion from XYZ values into RGB values to be described later. The subsequent rendering processing is executed using the general ray tracing, and a generated XYZ image is stored in the main memory 102.

With the above processing, a pseudo 3D presentation image of 1280 dots (horizontal)×1024 dots (vertical), which is expressed by XYZ values, is generated.

XYZ→RGB Conversion Processing

Figure 7:
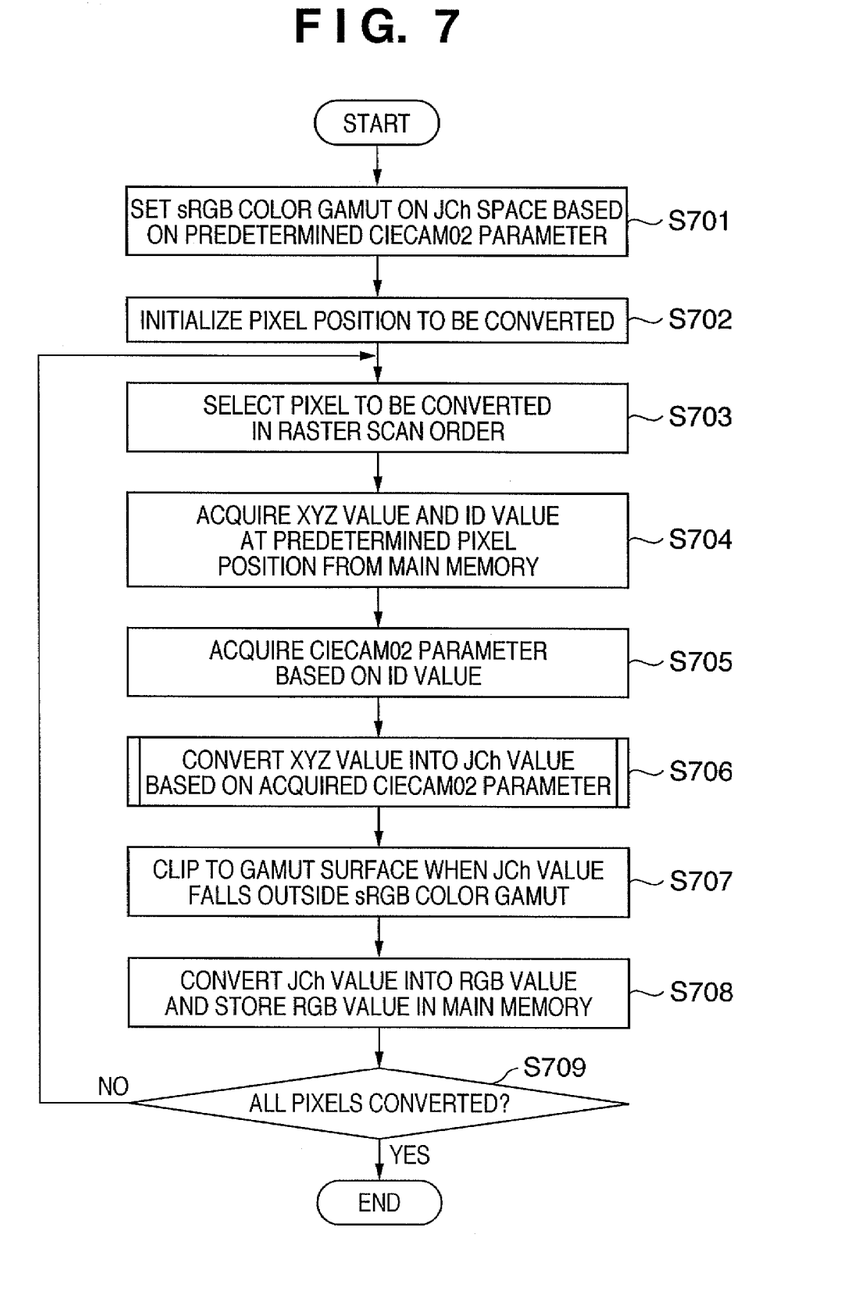
FIG. 7 is a flowchart showing the conversion processing from an XYZ color into an ROB color in the rendering processing in this embodiment.

The processing for converting an image expressed by XYZ values into that expressed by RGB values will be described below with reference to the flowchart shown in FIG. 7. Note that this embodiment uses sRGB conversion formulas for conversion between RGB values and XYZ values.

In step S701, the CPU 101 calculates an sRGB color gamut on a JCh space based on CIECAM02 and sRGB conversion formulas (to be described later). CIECAM02 parameters to be referred to in this step are predetermined, and the same predetermined parameters are used in step S708 (to be described later). Other representative parameters are sequentially set as follows.

The CPU 101 initializes a pixel position to be converted in step S702, and updates it in a raster scan order in step S703. In step S704, the CPU 101 acquires the XYZ values of a pixel located at the selected pixel position, and an object ID value associated with that pixel. In step S705, the CPU 101 acquires CIECAM02 parameters based on the acquired object ID value. More specifically, the CPU 101 scans the "light source information (1 to m)" in the "light source object data" and the "object information (1 to n)" in the "body object data" in the object data structure shown in FIG. 3. Then, the CPU 101 acquires CIECAM02 parameters set as the "appearance information" from the "light source information (1 to m)" or "object information (1 to n)", the scanned ID value of which matches the object ID value acquired in step S704.

In step S706, the CPU 101 converts the XYZ values acquired in step S704 into JCh values based on the CIECAM02 parameters acquired in step S705. The CIECAM02 conversion formulas at this time will be described later.

In step S707, the CPU 101 executes inside/outside determination of the JCh values generated in step S706 for the sRGB color gamut generated in step S701. If the JCh values fall outside the color gamut, the CPU 101 clips the JCh values to the color gamut surface; if the JCh values fall within the color gamut, it holds the JCh values intact.

In step S708, the CPU 101 inversely converts the JCh values obtained as the processing result of step S707 into XYZ values based on the same predetermined CIECAM02 parameters as those in step S701. The CPU 101 converts the XYZ values into RGB values based on sRGB conversion formulas, and stores the RGB values in the main memory 102.

The CPU 101 then checks in step S709 if the processes in steps S703 to S708 are executed for all pixels of 1280 dots (horizontal)×1024 dots (vertical) corresponding to the screen 607. If all pixels have been processed, the CPU 101 ends the conversion operation; otherwise, the process returns to step S703.

With the above processing, an RGB image of 1280 dots (horizontal)×1024 dots (vertical) based on the appearance parameters for each object is generated as a pseudo 3D presentation image.

Figure 8:
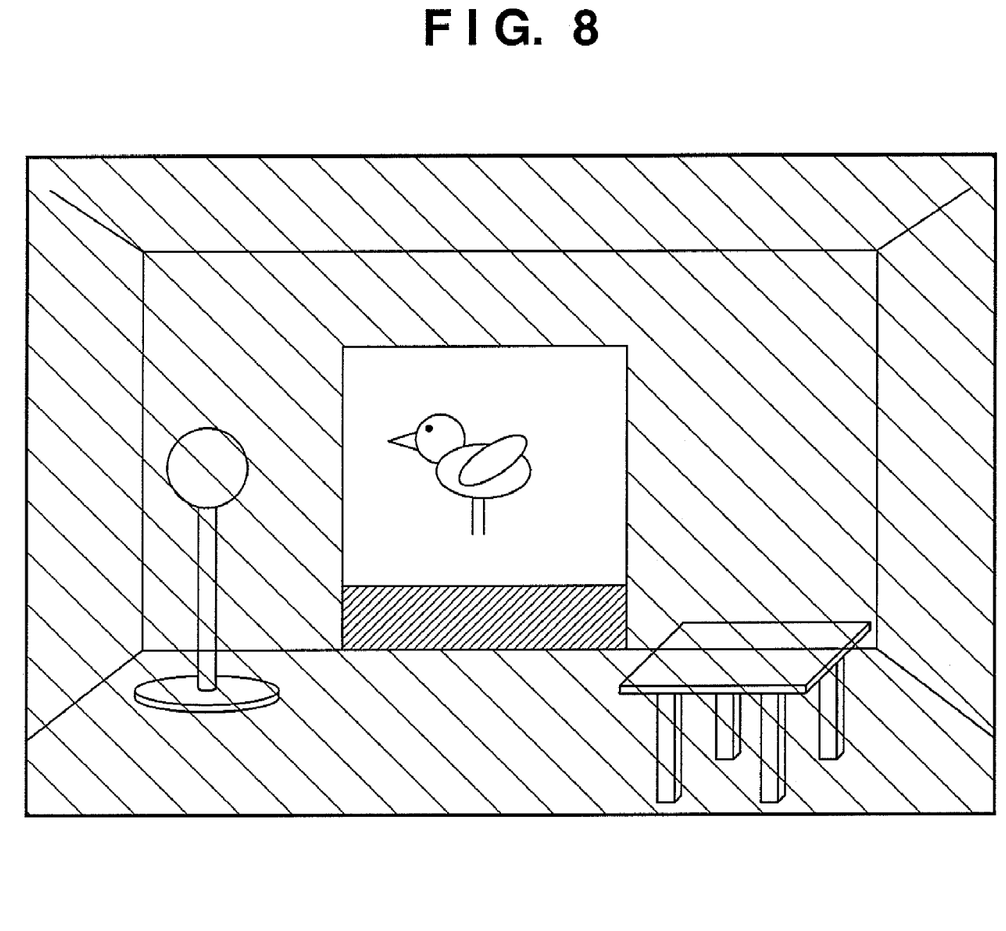
FIG. 8 shows an example of the rendering result in this embodiment.

FIG. 8 shows an example of a pseudo 3D presentation image generated by rendering of this embodiment. By contrast, a pseudo 3D presentation image generated regardless of the appearance parameters for each object includes an unnaturally dark interior, as shown in FIG. 9 above. In this way, according to this embodiment, a satisfactory pseudo 3D image free from any dark interior can be generated, as shown in FIG. 8.

CIECAM02 Forward Conversion Processing

The CIECAM02 forward conversion processing of this embodiment will be described below. The CIECAM02 forward conversion includes three conversion blocks, that is, a color adaptation block, cone response block, and psychological value conversion block. The processes in these blocks will be described in turn below.

The color adaptation block converts X, Y, and Z values into R, G, and B values indicating the spectral sensitivity of a cone using:

$$\begin{bmatrix} R \\ G \\ B \end{bmatrix} = M_{cat02} \begin{bmatrix} X \\ Y \\ Z \end{bmatrix} \quad (1)$$

$$M_{cat02} = \begin{bmatrix} 0.7328 & 0.4296 & -0.1624 \\ -0.7036 & 1.6975 & 0.0061 \\ 0.0030 & 0.0136 & 0.9834 \end{bmatrix}$$

and normalizes the R, G, and B signals of each cone by the value of a white point of a light source using:

$$Rc=[(YwD/Rw)+(1-D)]R$$

$$Gc=[(YwD/Gw)+(1-D)]G$$

$$Bc=[(YwD/Bw)+(1-D)]B \quad (3)$$

Note that an adaptation coefficient D in formulas (3) is calculated by:

$$D = F\left[1 - \left(\frac{1}{3.6}\right)e^{\left(\frac{-(La-42)}{92}\right)}\right] \quad (4)$$

Finally, the block obtains X', Y', and Z' values corresponding to the light source in the viewing environment by applying, to the normalized R, G, and B values, inverse conversion given by:

$$\begin{bmatrix} X \\ Y \\ Z \end{bmatrix} = M_{cat02}^{-1} \begin{bmatrix} R \\ G \\ B \end{bmatrix} \quad (2)$$

$$M_{cat02}^{-1} = \begin{bmatrix} 1.096124 & -0.278869 & 0.182745 \\ 0.454369 & 0.473533 & 0.072098 \\ -0.009628 & -0.005698 & 1.015326 \end{bmatrix}$$

The cone response block converts the X', Y', and Z' values obtained by the color adaptation block into spectral sensitivity values R', G', and B' of the cone using:

$$\begin{bmatrix} R' \\ G' \\ B' \end{bmatrix} = M_{HPE} \begin{bmatrix} X' \\ Y' \\ Z' \end{bmatrix} \quad (5)$$

$$M_{HPE} = \begin{bmatrix} 0.38971 & 0.68898 & -0.07868 \\ -0.22981 & 1.18340 & 0.04641 \\ 0.00000 & 0.00000 & 1.00000 \end{bmatrix}$$

and further converts the converted values into cone response values Ra', Ga', and Ba' after adaptation according to the amount of light intensity that enters the eye, using:

$$Ra' = \frac{400(F_L R'/100)^{0.42}}{27.13 + (F_L R'/100)^{0.42}} + 0.1 \quad (6)$$

$$Ga' = \frac{400(F_L G'/100)^{0.42}}{27.13 + (F_L G'/100)^{0.42}} + 0.1$$

$$Ba' = \frac{400(F_L B'/100)^{0.42}}{27.13 + (F_L B'/100)^{0.42}} + 0.1$$

Note that factors in the respective formulas of this embodiment are respectively given by:

Luminance Adaptation Factor:

$$k=1/(5La+1)$$

$$FL=0.2k^4(5La)+0.1(1-k^4)^2(5La)^{1/3}$$

$$n=Yb/Yw$$

Background Induction Factor:

$$Nbb=Ncb=0.725(1/n)^{0.2}$$

Index of Nonlinear Conversion:

$$z=1.48+\sqrt{n}$$

The psychological value conversion block converts the cone response values Ra', Ga', and Ba' obtained by the cone response block into signal values of an achromatic color response A and opponent color responses a and b of the visual area using:

Achromatic Color Response:

$A = [2Ra' + Ga' + (1/20)Ba' - 0.305]Nbb$ (7)

Red-Green Opponent Color Response:

$a = Ra' + 12Ga'/11 + Ba'/11$ (8)

Yellow-Blue Opponent Color Response:

$b = (1/9)(Ra' + Ga' - 2Ba')$ (9)

Then, the block converts these signal values into a perceived lightness J value, perceived saturation C value, and perceived hue h value using:

Lightness:

$$J = 100(A/Aw)^{cZ} \quad (10)$$

Hue angle:

$$h = \tan^{-1}(b/a) \quad (11)$$

Saturation:

$$C = t^{0.9}\sqrt{J/100}\,(1.64 - 0.29^n)^{0.73} \quad (12)$$

for $$e^t = \frac{1}{4}\left[\cos\left(h\frac{\pi}{180} + 2\right) + 3.8\right]$$

$$t = \frac{(50000/13)NcNcbe^t(a^2 + b^2)^{1/2}}{Ra' + Ga' + (21/20)Ba'}$$

The CIECAM02 forward conversion processing of this embodiment has been explained. As for CIECAM02 inverse conversion, CIECAM02 parameters are set, a new achromatic color response Aw is calculated in the aforementioned forward conversion process, and inverse processes of the forward conversion processing are executed using this Aw, JCh value, and coefficients, thus converting into X, Y, and Z values.

[Window Display]

The processing executed when the RGB pseudo 3D presentation image generated by the aforementioned rendering processing is displayed on a window on the color monitor 106, as shown in FIG. 2A, will be described below.

The pseudo 3D presentation image is generated by the aforementioned rendering processing according to the pixel size of the screen 607 shown in FIG. 6. Conversion from the number of pixels based on the screen 607 into the number of pixels to be displayed on the window is executed as follows. That is, the pseudo 3D presentation image generated by this embodiment undergoes processing using an anti-alias filter, and then the conversion into the number of pixels to be displayed on the window. When the number of pixels of the screen is larger than the number of pixels of an image to be displayed, the conversion into the number of pixels to be displayed on the window is executed by down-sampling. When the number of pixels of the screen is smaller than the number of pixels of an image to be displayed, the conversion is executed by up-sampling. The sampling result is displayed on the window shown in FIG. 2A.

Effects of this Embodiment

As described above, according to this embodiment, appearance parameters are set for each object, and rendering is done based on the appearance parameters, thus generating a pseudo 3D presentation image. In this manner, the display colors of the pseudo 3D display image can be approximated to the human visual perception. Therefore, even when the contrast of the rendering image becomes very strong as in the case wherein objects are allocated such that the user can figuratively look outdoors from the interior of the house, a satisfactory pseudo 3D image corresponding to the adaptation state of the human visual perception, that is, closer to the subjective perception can be obtained.

<Modification>

In the example of this embodiment, CIECAM02 is used as the color appearance model. However, the present invention is not limited to this example, and other color appearance models such as CIECAM97s and the like may be used. Furthermore, the conversion processes may use an L*a*b* color space or L*u*v* color space, and only an adaptation white point may be used as the appearance parameter.

In the example of this embodiment, the XYZ color space is used as the color coordinate system for object data. However, since the present invention has no constraint condition on the color coordinate system, an RGB color space or spectral distribution may be used.

Other Embodiments

The present invention can adopt embodiments in the forms of a system, apparatus, method, program, storage medium (recording medium), and the like. More specifically, the present invention can be applied to either a system constituted by a plurality of devices (e.g., a host computer, interface device, image sensing device, Web application, and the like), or an apparatus consisting of a single device.

Note that the present invention can also be achieved by directly or remotely supplying a program of software that implements the functions of the aforementioned embodiments to a system or apparatus, and reading out and executing the supplied program code by a computer of that system or apparatus. The program in this case is that corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a recording medium for supplying the program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As a program supply method, the following method may be used. The user establishes a connection to a home page on the Internet using a browser on a client computer, and downloads the computer program itself of the present invention (or a compressed file including an automatic installation function) from the home page onto a recording medium such as a hard disk or the like. Also, the program code that forms the program of the present invention may be segmented into a plurality of files, which may be downloaded from different home pages. In other words, the present invention includes a WWW server which makes a plurality of users download a program file required to implement the functional processing of the present invention by the computer.

Also, a storage medium such as a CD-ROM or the like, which stores the encrypted program of the present invention, may be delivered to the user, and the user who has cleared a predetermined condition may be allowed to download key information used to decrypt the encrypted program from a home page via the Internet. The user executes the encrypted program using the downloaded key information to install the program on a computer.

The functions of the aforementioned embodiments can be implemented when the computer executes the readout program. Furthermore, the functions of the aforementioned embodiments can be implemented when an OS or the like running on the computer executes some or all of actual processing operations based on an instruction of that program.

Furthermore, the functions of the aforementioned embodiments can be implemented when the program read out from the recording medium is written in a memory equipped on a function expansion board or a function expansion unit, which is inserted into or connected to the computer, and is then executed. Therefore, a CPU equipped on the function expansion board or function expansion unit can execute some or all of actual processing operations based on the instruction of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-331137 filed Dec. 7, 2006 which is hereby incorporated by reference herein in its entirety.

What is claimed is:

1. An image generation apparatus comprising:
   a holding unit configured to hold object data which includes positional information of an object and first appearance information of the object, for each of a plurality of objects;
   a generation unit configured to generate a pseudo three-dimensional image, wherein the pseudo three-dimensional image is obtained on a screen which is placed in a world coordinate system when each of the plurality of objects is projected on the screen, wherein the object is placed in the world coordinate system in accordance with the positional information included in the object data for the object which is projected;
   a forward conversion unit configured to convert a color value of each pixel of the pseudo three-dimensional image into a perceptual value, by using the first appearance information included in the object data for the object which is projected on each pixel; and
   an inverse conversion unit configured to generate a second pseudo three-dimensional image after color conversion, by converting the perceptual value of each pixel of the pseudo three-dimensional image into a second color value using predetermined second appearance information which is commonly used for each pixel.

2. The image generation apparatus according to claim 1, wherein the first appearance information is an adaptation white point.

3. The image generation apparatus according to claim 1, further comprising a configuration unit configured to set the first appearance information in accordance with a user instruction.

4. An image generation method comprising:
   holding object data which includes positional information of an object and first appearance information of the object, for each of a plurality of objects;
   generating a pseudo three-dimensional image, wherein the pseudo three-dimensional image is obtained on a screen which is placed in a world coordinate system when each of the plurality of objects is projected on the screen, wherein the object is placed in the world coordinate system in accordance with the positional information included in the object data for the object which is projected;
   converting a color value of each pixel of the pseudo three-dimensional image into a perceptual value, by using the first appearance information included in the object data for the object which is projected on each pixel; and
   generating a second pseudo three-dimensional image after color conversion, by converting the perceptual value of each pixel of the pseudo three-dimensional image into a second color value using predetermined second appearance information which is commonly used for each pixel.

5. A non-transitory computer-readable storage medium retrievably storing a program for making a computer function as each unit of the image generation apparatus according to claim 1, when the program is executed on the computer.

6. The image generation apparatus according to claim 1, further comprising a clipping unit configured to clip the perceptual value of each pixel of the pseudo three-dimensional image into a color gamut generated using the second appearance information.

7. The image generation apparatus according to claim 1, wherein the holding unit is further configured to hold the positional information of the object and the first appearance information of the object, for each of the plurality of objects, in a predetermined structure.

* * * * *